(12) United States Patent
Knight et al.

(10) Patent No.: US 10,907,508 B2
(45) Date of Patent: Feb. 2, 2021

(54) TURBINE ENGINE AND EXHAUST SYSTEM CONNECTION

(71) Applicant: ROHR, INC., Chula Vista, CA (US)

(72) Inventors: Michael Knight, Oceanside, CA (US); Fadi Iskander, El Cajon, CA (US); Narek Geghamyan, Northridge, CA (US)

(73) Assignee: Rohr, Inc., Chula Vista, CA (US)

( * ) Notice: Subject to any disclaimer, the term of this patent is extended or adjusted under 35 U.S.C. 154(b) by 237 days.

(21) Appl. No.: 15/013,182

(22) Filed: Feb. 2, 2016

(65) Prior Publication Data
US 2017/0138219 A1 May 18, 2017

Related U.S. Application Data

(60) Provisional application No. 62/254,646, filed on Nov. 12, 2015.

(51) Int. Cl.
*F01D 25/30* (2006.01)
*F01D 25/28* (2006.01)
(Continued)

(52) U.S. Cl.
CPC ............. *F01D 25/30* (2013.01); *F01D 9/041* (2013.01); *F01D 25/24* (2013.01); *F01D 25/28* (2013.01);
(Continued)

(58) Field of Classification Search
CPC .......... F01D 9/041; F01D 25/30; F01D 25/24; F01D 25/243; F01D 25/28; F01D 25/005; F05D 2220/323; F05D 2300/177; F05D 2300/6033; F05D 2240/128; F02K 1/04; F02K 1/80
See application file for complete search history.

(56) References Cited

U.S. PATENT DOCUMENTS 7,329,097 B2 2/2008 Kirk
8,397,383 B2 3/2013 Barnett et al.
(Continued)

FOREIGN PATENT DOCUMENTS

EP 2930113 10/2015
EP 3018305 5/2016
(Continued)

OTHER PUBLICATIONS

Extended European Search Report dated May 4, 2017 in European Application No. 16197898.6.
(Continued)

*Primary Examiner* — Justin D Seabe
*Assistant Examiner* — Jesse M Prager
(74) *Attorney, Agent, or Firm* — Snell & Wilmer L.L.P.

(57) ABSTRACT

A ceramic matrix composite ("CMC") center body may be positioned around an austenitic nickel-chromium-based superalloy attachment ring. The attachment ring may be integrally formed with a turbine engine case. The attachment ring may have a greater coefficient of thermal expansion than the center body. A plurality of pins may be inserted through apertures in the center body and coupled to the attachment ring. The pins may slide within the apertures, allowing the attachment ring to expand without applying a load on the center body.

19 Claims, 6 Drawing Sheets

(51) Int. Cl.
*F02K 1/80* (2006.01)
*F01D 25/24* (2006.01)
*F02K 1/04* (2006.01)
*F01D 9/04* (2006.01)

(52) U.S. Cl.
CPC .................. *F02K 1/04* (2013.01); *F02K 1/80* (2013.01); *F05D 2220/30* (2013.01); *F05D 2220/323* (2013.01); *F05D 2230/642* (2013.01); *F05D 2300/176* (2013.01); *F05D 2300/177* (2013.01); *F05D 2300/20* (2013.01); *F05D 2300/6033* (2013.01); *Y02T 50/60* (2013.01)

(56) References Cited

U.S. PATENT DOCUMENTS

| | | | |
|---|---|---|---|
| 2005/0129499 A1* | 6/2005 | Morris | F01D 9/04 415/1 |
| 2010/0102144 A1* | 4/2010 | Conete | F01D 25/243 239/265.11 |
| 2014/0165574 A1* | 6/2014 | Bienvenu | F02K 1/04 60/770 |
| 2015/0152788 A1* | 6/2015 | De Sousa | F01D 25/24 60/39.5 |
| 2015/0226083 A1 | 8/2015 | Renggli et al. | |
| 2015/0291271 A1* | 10/2015 | Benner | B64C 1/069 403/376 |
| 2015/0322890 A1* | 11/2015 | Lu | F02K 1/80 60/770 |
| 2016/0177785 A1* | 6/2016 | Benson | F01D 25/24 415/214.1 |
| 2016/0326911 A1* | 11/2016 | Karafillis | F01D 25/28 |

FOREIGN PATENT DOCUMENTS

| | | |
|---|---|---|
| FR | 2914707 | 10/2008 |
| WO | 2014058502 | 4/2014 |

OTHER PUBLICATIONS

European Patent Office, European Office Action dated Nov. 13, 2018 in Application No. 16197898.6.

* cited by examiner

TURBINE ENGINE AND EXHAUST SYSTEM CONNECTION

CROSS-REFERENCE TO RELATED APPLICATIONS

The present application claims priority to U.S. Provisional application Ser. No. 62/254,646 filed on Nov. 12, 2015 and entitled TURBINE ENGINE AND EXHAUST SYSTEM CONNECTION, the contents of which are incorporated by reference herein in their entirety.

FIELD

The present disclosure relates to a connection between a turbine engine for aircraft propulsion and an exhaust system and, more particularly, a connection between a metallic component of the turbine engine and a non-metallic (e.g. ceramic, etc.) exhaust system.

BACKGROUND

Turbine engine exhaust systems for a turbofan propulsion system on a commercial airliner typically include a center body assembly (or plug) radially surrounded by a nozzle assembly. The center body assembly and the nozzle assembly together help define between them an annular flow path for the hot, high velocity exhaust gas from the engine. Most commonly, the nozzle assembly and the center body assembly are made of the same or similar metallic material as the adjacent engine structure, and simple mechanical attachments are used between them. Metallic materials have operating temperature limitations—above certain temperatures their mechanical properties significantly degrade and may not be sufficient for the application. Today, exhaust gas temperatures of commercial airliner propulsion systems are typically not too hot for a metallic exhaust system, although some engines have exhaust temperatures hot enough that more exotic, expensive and heavy metallic material systems must be used. In the future, engine exhaust temperatures of more advanced engines are expected to rise and will exceed the capability limits of most practical metallic material systems. As an alternative, ceramic material systems have been widely explored for use in internal engine components and external components such as exhaust systems. Ceramics, and other non-metallic high temperature material systems, are good candidates because they can withstand higher operating temperatures and maintain adequate mechanical properties and are lightweight. But certain difficulties are impeding their wide acceptance and adoption, one of which is a very large mismatch with the coefficients of thermal expansion of the material systems used to make the engine. The coefficient of thermal expansion mismatch between ceramic materials and metallic materials drives the need for much more complicated attachment systems to connect structures together. This disclosure pertains primarily to a connection between a metallic engine aft structure of a turbine engine, and a ceramic center body assembly or nozzle assembly that accommodates the wide difference in coefficients of thermal expansion.

SUMMARY

A turbine engine case may comprise an outer cylinder, an inner cylinder, and an attachment extension coupled to and integral with the inner cylinder, the attachment extending axially aft of the inner cylinder, the attachment extension being of a smaller diameter than the inner cylinder with a transition section joining the attachment extension to the inner cylinder.

In various embodiments, the turbine engine case may comprise a plurality of vanes extending between the outer cylinder and the inner cylinder. The attachment extension may comprise a cylinder extending in an axial direction from the inner cylinder. The turbine engine case may comprise a ramp between the inner cylinder and the attachment extension. The attachment extension may comprise at least one of Inconel or Rene 41. A radius of the attachment extension may be smaller than a radius of the inner cylinder. The attachment extension may comprise a plurality of apertures configured to receive pins in a radial direction.

A center body connection system may comprise a turbine engine case comprising an attachment extension, a center body comprising a ceramic matrix composite ("CMC") housing, and a pin extending through a first aperture in the CMC housing and a second aperture in the attachment extension.

In various embodiments, the attachment extension may be integrally formed with the turbine engine case. In other words, the attachment extension and the turbine engine case are not coupled by another component, such as bolts or adhesive, but rather are formed as a single component. The turbine engine case may comprise an outer cylinder and an inner cylinder. A radius of the attachment extension may be smaller than a radius of the inner cylinder. The turbine engine case may comprise an integral component comprising the attachment extension, an inner cylinder, and a ramp between the attachment extension and the inner cylinder. A coefficient of thermal expansion of the attachment extension may be greater than a coefficient of thermal expansion of the CMC housing. The pin may be configured to slide through the first aperture in response to expansion of the attachment extension.

An aircraft propulsion system may comprise a turbine engine aft case comprising an inner cylinder with an aerodynamic outer radial surface that helps defines a flow path for engine exhaust gases, and an attachment extension extending generally axially in an aft direction from and integrally formed with the inner cylinder, and a center body housing made from a ceramic material, the center body housing at least partially radially overlapping the attachment extension.

In various embodiments, the inner cylinder and the attachment extension are part of a single integral component. The propulsion system may comprise a ramp between the inner cylinder and the attachment extension. The ramp may be located at an angle of between 95-105 degrees relative to an outer surface of the inner cylinder. The attachment extension may comprise at least one of Inconel® or Rene 41®. A seal may be configured to prevent exhaust from entering between the inner cylinder and the CMC housing.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

A ceramic matrix composite ("CMC") exhaust center body may be positioned around an annular attachment extension of a metallic engine aerodynamic surface or case. The attachment extension may be integrally formed with and of the same metallic material as the turbine engine case. The attachment extension is of a smaller diameter than the aerodynamic surface so that the CMC center body (positioned radially outward from the attachment extension) may provide an aerodynamically smooth transition from the engine. The attachment extension may have a greater coefficient of thermal expansion than the CMC material of the center body. To accommodate the difference, the center body is supported with a sliding fit around a plurality of radially extending pins that are attached to the attachment extension. The center body slides around the pins when the attachment extension expands or contracts at a faster rate than the CMC material.

Figure 1A:
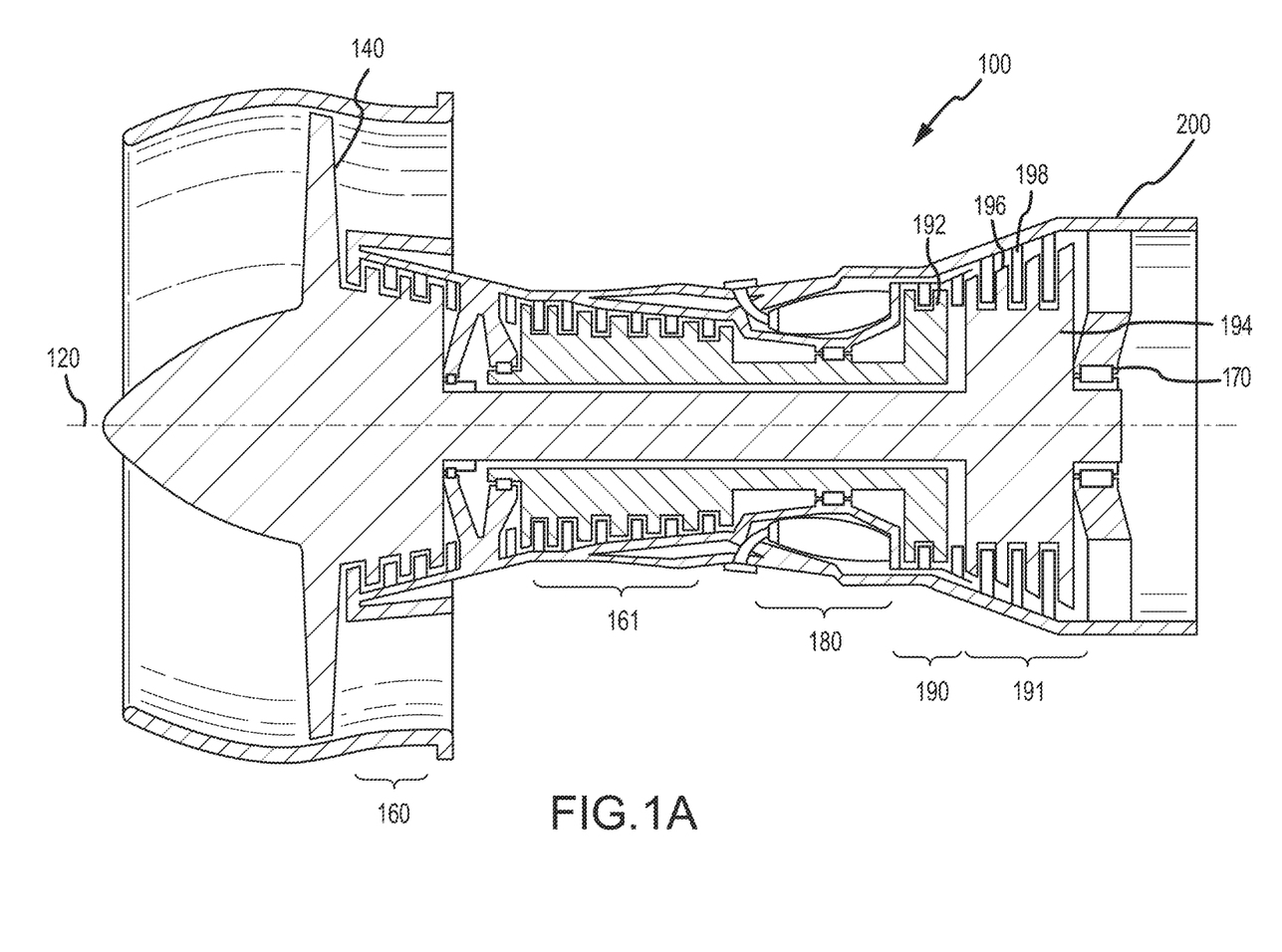
FIG. 1A illustrates a schematic cross-section view of a typical gas turbine engine.

Referring to FIG. 1A, a gas turbine engine 100 (such as a turbofan gas turbine engine) is schematically illustrated according to various embodiments. Gas turbine engine 100 is disposed about axial centerline axis 120, which may also be referred to as axis of rotation 120. Gas turbine engine 100 may comprise a fan 140, compressor sections 160 and 161, a combustion section 180, and turbine sections 190, 191. Air compressed in the compressor sections 160, 161 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198. Cooling air may be supplied to the turbine sections 190, 191 from the compressor sections 160, 161. A plurality of bearings 170 may support spools in the gas turbine engine 100. An aft turbine engine case 200 may direct exhaust out of the gas turbine engine 100. FIG. 1 provides a general understanding of the sections in a gas turbine engine, and is merely exemplary. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 1B:
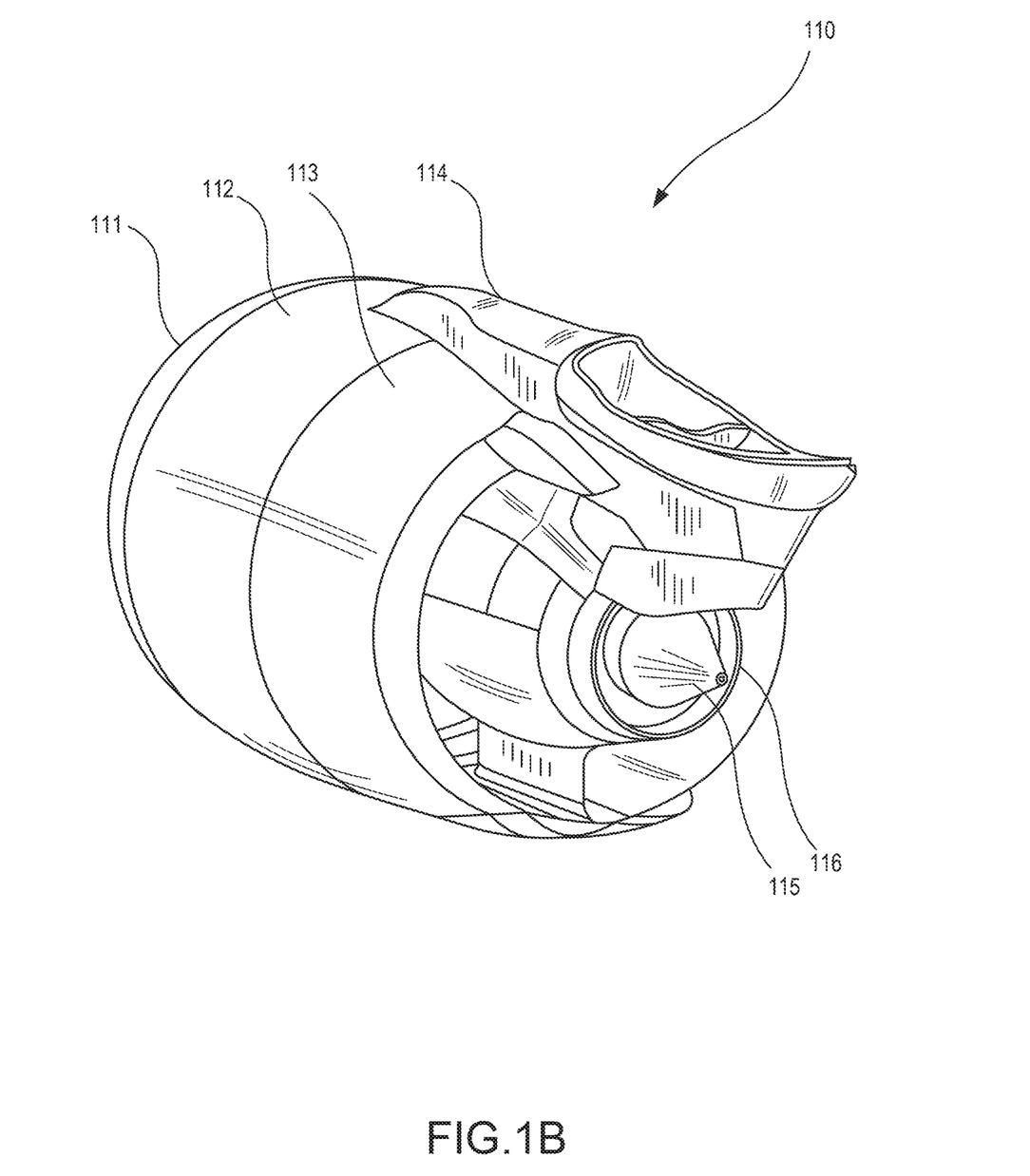
FIG. 1B illustrates a typical propulsion system and its elements.

Referring to FIG. 1B, a nacelle 110 for a gas turbine engine is illustrated according to various embodiments. Nacelle 110 may comprise an inlet 111, a fan cowl 112, and a thrust reverser 113. The various components of nacelle 110 may be coupled to the engine or to a pylon 114, which may mount the nacelle 110 to an aircraft wing or aircraft body. Nacelle 110 may further include an exhaust system comprising a nozzle assembly 116 and a center body assembly 115. High temperature, high velocity gas from the engine exits through the annular space between the nozzle assembly 116 and the center body assembly 115. The center body assembly 115 may be coupled to the gas turbine engine via a center body attachment system, as described with reference to FIGS. 2-5.

Figure 2:
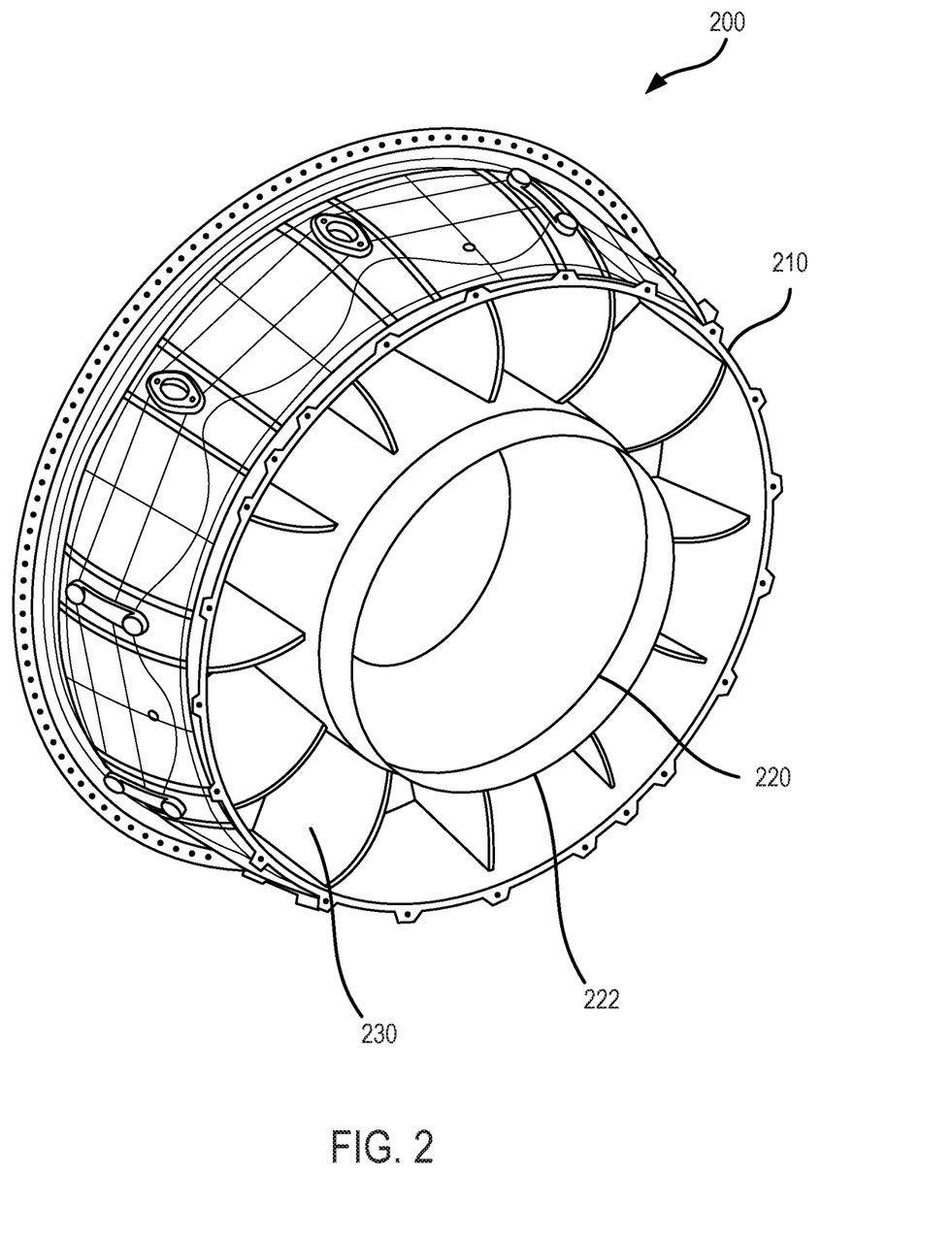
FIG. 2 illustrates a perspective view of an exemplary turbine engine aft case.

Referring to FIG. 2, an aft perspective view of an exemplary aft turbine engine case 200 is illustrated according to various embodiments. The aft turbine engine case 200 may comprise an outer cylinder 210 and an inner cylinder 220. A plurality of guide vanes 230 may extend between the outer cylinder 210 and the inner cylinder 220. Hot exhaust may exit the aft turbine engine case 200 between the outer cylinder 210 and the inner cylinder 220. The radially outer surface of the inner cylinder 220, and the radially inner surface of the outer cylinder 210 are both aerodynamic surfaces that define the air flow path of the exhaust gas. The aft turbine engine case 200 may comprise an attachment extension 222 extending in an aft direction from the inner cylinder 220. The attachment extension 222 may be configured to support and be coupled to a center body assembly. The inner cylinder 220 and the attachment extension 222 may be formed as a single integral component. In various embodiments, the aft turbine engine case 200 may be formed as a single integral component including the outer cylinder 210, the guide vanes 230, the inner cylinder 220, and the attachment extension 222. Thus, the attachment extension 222 may not comprise bolts or other attachment features which couple the attachment extension 222 to the inner cylinder 220.

Figure 3:
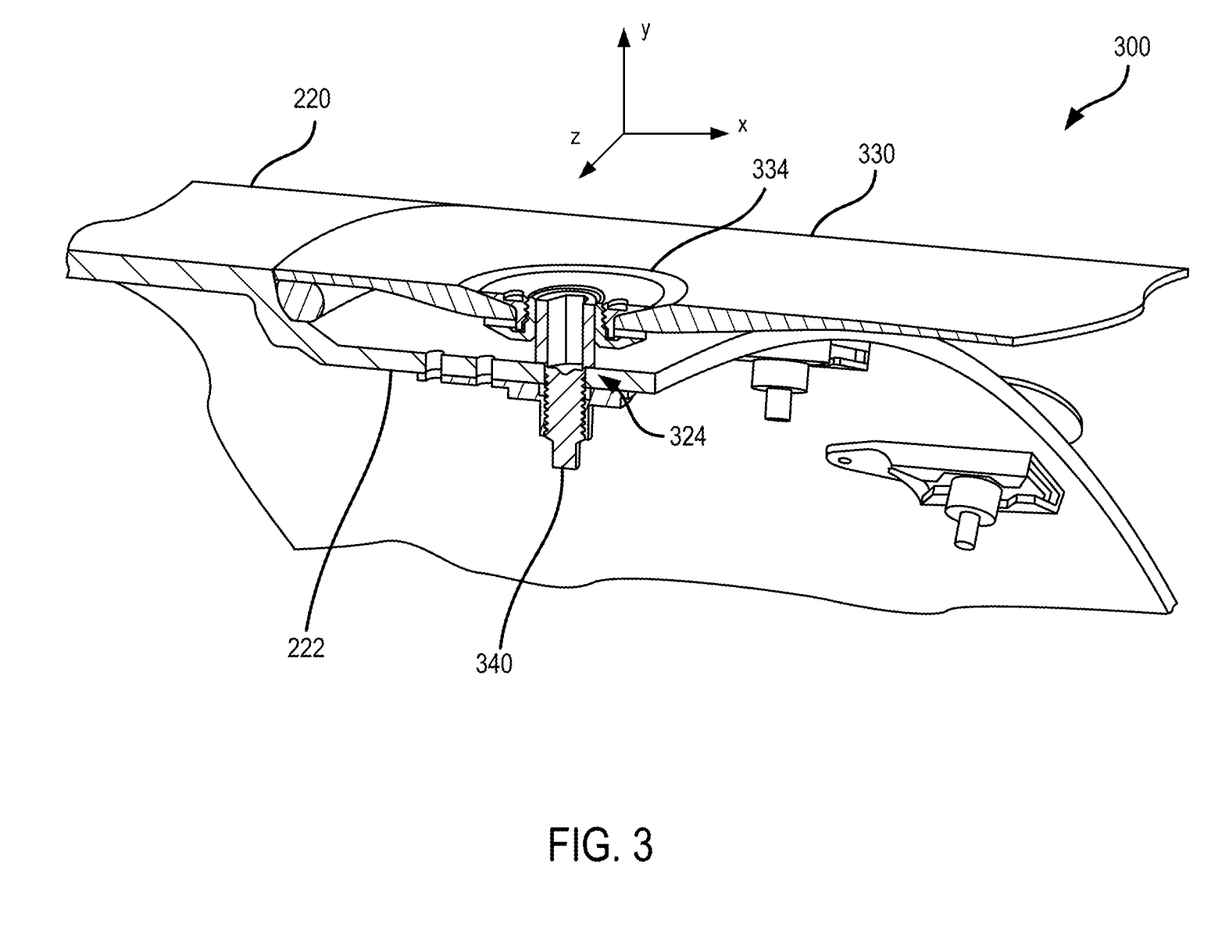
FIG. 3 illustrates a cut-away perspective view of a center body attachment structure in accordance with various embodiments.

Referring to FIG. 3, a center body attachment system 300 may couple together the attachment extension 222 and a ceramic matrix composite "CMC" housing 330 of a center body assembly. X-y-z axes are shown for ease of illustration. The attachment extension 222 may extend generally in an aft direction from the inner cylinder 220 of the turbine engine case. The attachment extension 222 may comprise an axially extending cylinder (about the x-axis), comprising an outer diameter chosen to fit radially inward (closer to the x-axis) of the CMC housing 330. The CMC housing 330 may be slid onto the attachment extension 222. The illustrated center body attachment system 300 is exemplary only and could constitute other designs as will be apparent to those of ordinary skill in this art. In the illustrated embodiment, the CMC housing 330 may be coupled to the attachment extension 222 via a plurality of pins 340. The pins 340 may be inserted in a radial direction through a plurality of apertures 334 in the CMC housing 330 and a plurality of apertures 324 in the attachment extension 222.

The inner cylinder 220 and the attachment extension 222 may comprise a material having a coefficient of thermal expansion greater than the coefficient of thermal expansion of the CMC housing 330. In various embodiments, the inner cylinder 220 and the attachment extension 222 may comprise an austenitic nickel-chromium-based alloy such as Inconel®, which is available from Special Metals Corporation of New Hartford, N.Y., USA. However, the inner cylinder 220 and the attachment extension 222 may comprise a variety of nickel and chromium based alloys, such as Inconel® MA754, an oxide dispersion strengthened nickel-chromium super alloy; Rene 41, a nickel-cobalt high temperature alloy; Haynes® 244, a nickel-cobalt alloy manufactured by Haynes International, Inc.; or Haynes® 282 a wrought gamma-prime strengthened superalloy manufactured by Haynes International, Inc. The exhaust system may be subject to operating environments that experience a wide range of temperatures, such as from 0° F. to 1,500° F. (−20° C. to 820° C.). The attachment extension 222 may expand more than the CMC housing 330 in response to the same increase in temperature. The pins 340 may slide in a radial direction within the apertures 334 in the CMC housing 330. The center body attachment system 300 may be configured to decrease loading on the CMC housing 330 which could cause the CMC housing 330 to crack or otherwise be damaged in response to a change in temperature.

Figure 4:
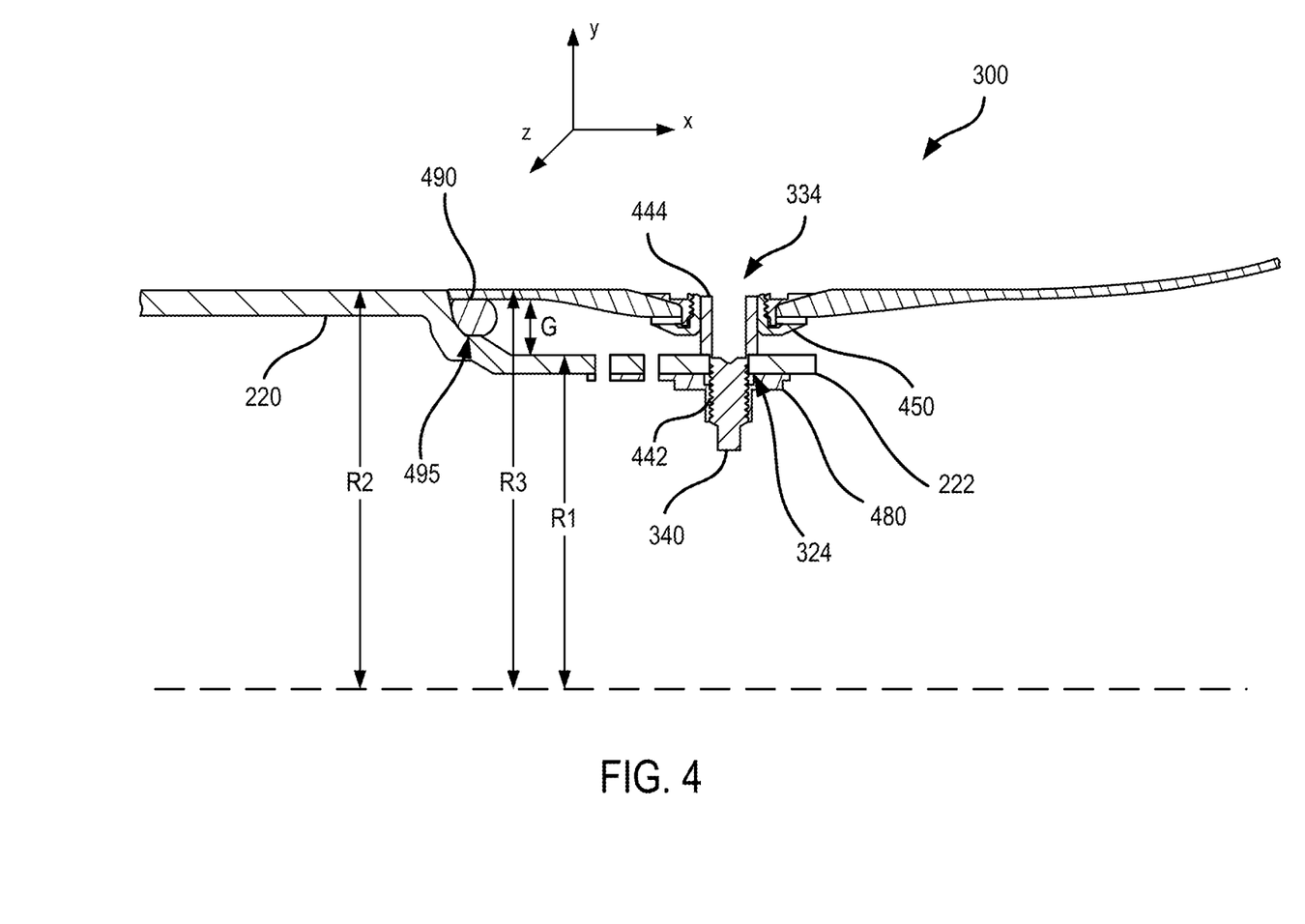
FIG. 4 illustrates a cross-sectional view of a center body attachment structure in accordance with various embodiments.

Referring to FIG. 4, a cross section of a portion of the center body attachment system 300 is illustrated according to various embodiments. The attachment extension 222 may be integrally aimed with the inner cylinder 220 of the aft turbine engine case. The attachment extension 222 may comprise a radius R1 which is less than the radius R2 of the inner cylinder 220. The radius R1 of the attachment extension 222 may also be smaller than the radius R3 of the CMC housing 330. The CMC housing 330 may be located around the attachment extension 222 and separated from the attachment extension 222 by a gap G. The CMC housing 330 may comprise an aperture 334. A bushing nut 450 may be located at least partially within the aperture 334.

The pin 340 may be inserted through the bushing nut 450. A threaded shaft 442 of the pin 340 may be inserted through an aperture 324 in the attachment extension 222. The threaded shaft 442 may be threaded into a nutplate 480. The pin 340 may be tightened until the head 444 of the pin 340 contacts the attachment extension 222, clamping the pin 340 and the nutplate 480 to the attachment extension 222. The head 444 may be configured to translate within the bushing nut 450.

A seal 490 may be disposed about a radially outward surface (along the y-axis) of the attachment extension 222 between the attachment extension 222 and the CMC housing 330. In various embodiments, the seal 490 tends to prevent exhaust gases from entering between the juncture of the inner cylinder 220 and the CMC housing 330. In various embodiments, the seal 490 comprises a curved piece of mechanically elastic material, for example, an elastic metal. In various embodiments, the seal 490 comprises an austenitic nickel-chromium-based alloy. A small land 495 may be formed on the attachment extension 222 near its transition to the inner cylinder 220 to support the seal 490.

At cruise temperature, the CMC housing 330 and the inner cylinder 220 may be designed to be substantially flush, forming between them a relatively smooth aerodynamic transition that will not create too much drag. However, because the CMC housing 330 and the inner cylinder 220 expand and contract at different rates, at lower temperatures, the radius R3 of the CMC housing 330 may be larger than the radius R2 of the inner cylinder, and at higher temperatures the radius R3 of the CMC housing 330 may be smaller than the radius R2 of the inner cylinder 220.

Figure 5A:
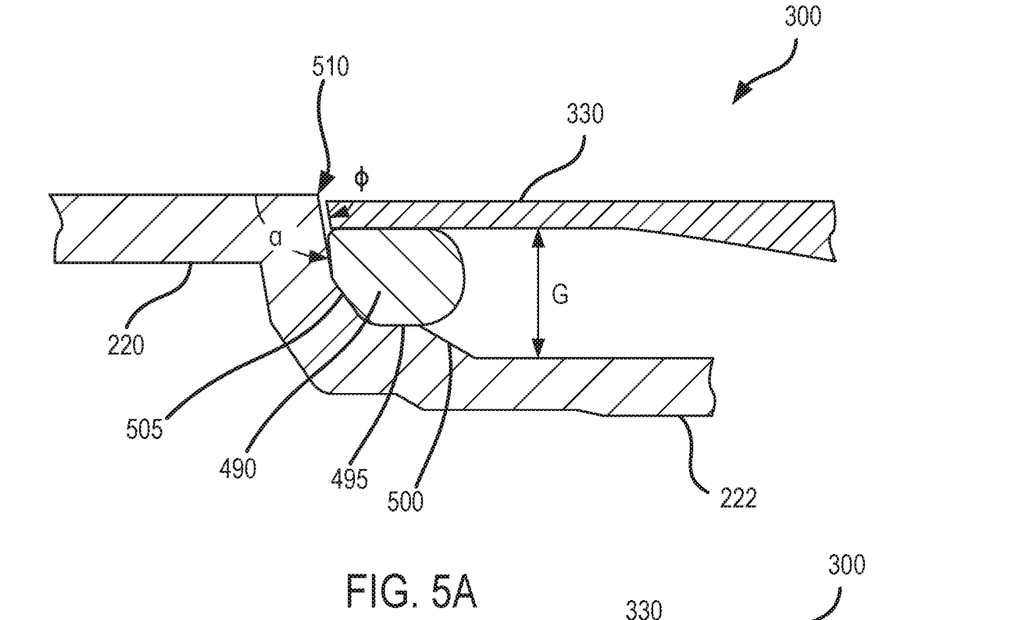
FIG. 5A illustrates a cross-sectional view of a center body attachment structure at a high temperature in accordance with various embodiments.

Referring to FIG. 5A, a cross section of a portion of the center body attachment system 300 is illustrated at an increased temperature relative to FIG. 4 according to various embodiments. For example, during takeoff, engines operate at relatively high temperatures. As the temperature increases, the attachment extension 222 and the inner cylinder 220 may expand more rapidly than the CMC housing 330 as a result of the differing coefficients of thermal expansion. The different rates of expansion may cause the gap G to decrease. As the attachment extension 222 expands, the seal 490 may be compressed between the attachment extension 222 and the CMC housing 330.

In addition to expanding radially, the components expand in the axial direction. The turbine engine case may comprise an attachment extension 222, which may comprise a transition section comprising a ramp 510, a first transition surface 505, a land 495, and a second transition surface 500 adjacent to the inner cylinder 220. The ramp 510 may be positioned at an angle α relative to the radially inner surface of the inner cylinder 220. In various embodiments, the angle α may be between 100-101 degrees, or between 95-105 degrees. Similarly, an axial front face of the CMC housing 330 may be angled relative to the outer surface of the CMC housing 330 at an angle φ. In various embodiments, the angle φ may be between 79-80 degrees, or between 75-85 degrees. In various embodiments, the angles α and φ may be supplemental angles, such that the sum of the two angles adds to 180 degrees. As the turbine engine case and the CMC center body expand and contract, the distance between the ramp 510 and the axial front face of the CMC housing 330 may remain constant due to the angles α and φ and the two surfaces remain parallel to one another.

Figure 5B:
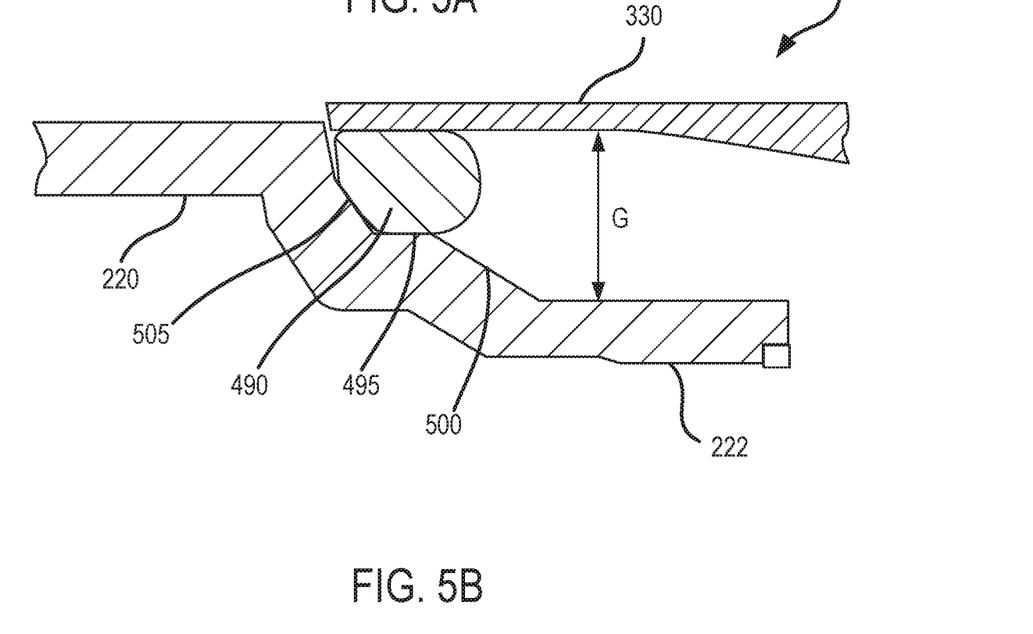
FIG. 5B illustrates an cross-sectional view of a center body attachment structure at a low temperature in accordance with various embodiments.

Referring to FIG. 5B, a cross section of a portion of the center body attachment system 300 is illustrated at a decreased temperature relative to FIG. 4 according to various embodiments. For example, during engine idle, or with the engine turned off, engines operate at relatively low temperatures. As the temperature decreases, the attachment extension 222 and the inner cylinder 220 may contract more rapidly than the CMC housing 330 as a result of the differing coefficients of thermal expansion. The different rates of expansion may cause the gap G to increase. As the attachment extension 222 contracts, the seal 490 may decompress but still maintain contact between the attachment extension 222 and the CMC housing 330.

In various embodiments, center body attachment systems may comprise multiple materials, or any material configuration suitable to enhance or reinforce the resiliency and/or support of the system when subjected to wear in an aircraft operating environment or to satisfy other desired electromagnetic, chemical, physical, or biological properties, for example radar signature, load capacity, and/or heat tolerance.

In various embodiments, various components may comprise a CMC. For example, various aspects of the center body and/or the CMC housing 330 may comprise a CMC. However, in various embodiments, the center body and/or the CMC housing 330 may comprise at least one of a carbon-carbon composite, a ceramic material, graphite, titanium, Inconel®, Rene 41®, or any other suitable material, such as a high temperature oriented metal alloy. Thus, as discussed herein, the center body and the CMC housing 330 may exhibit a different coefficient of thermal expansion than the inner cylinder 220 and the attachment extension 222. However, the different materials may be securely mounted in slidable mechanical communication according to the principles discussed herein. In various embodiments, a CMC may generally comprise one or more ceramic materials disposed on or within another material, such as, for example, a ceramic material disposed within a structure comprised of a fibrous material. Fibrous materials, such as carbon fiber, aramid fibers, fiberglass fibers, and the like may be formed into fibrous structures suitable for this purpose. Deposition of a ceramic material into or onto a fibrous material may be accomplished using chemical vapor infiltration (CVI), melt infiltration (MI), and slurry casting (SC) may be used, alone or in various combinations, to partially or fully impregnate a fibrous structure with the ceramic material.

Moreover, the center body 150 may comprise any material suitably lightweight and heat tolerant. In various embodiments, various aspects of the center body 150 may comprise refractory metal, for example, an alloy of titanium, for example titanium-zirconium-molybdenum (TZM).

While the center body attachment systems described herein have been described in the context of aircraft applications, one will appreciate in light of the present disclosure that the system described herein may be used in connection with various other vehicles, for example, a launch vehicle, a spacecraft, an unmanned aerial vehicle, a missile, cars, trucks, busses, trains, boats, and submersible vehicles, or any other vehicle or device, or in connection with industrial processes, or propulsion systems, or any other system or process having different materials exposed to fluctuating temperatures.

Additionally, although described primarily with reference to ceramic matrix composite center bodies, the present disclosure may be used with various materials having relatively low coefficients of thermal expansion, such as carbon-carbon composites, ceramic materials, and graphite. The systems disclosed herein may be used to attach any components having differing coefficients of thermal expansion.

Although described primarily with reference to coupling the aft turbine engine case to the center body assembly, the connection systems described herein may similarly be applied to coupling the nozzle assembly to the outer cylinder of the aft turbine engine case in systems where the nozzle assembly has a different coefficient of thermal expansion than the aft turbine engine case.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

We claim:

1. A turbine engine case comprising:
an outer cylinder;
an inner cylinder comprising an outer surface;
an attachment extension coupled to the inner cylinder, the attachment extension extending axially aft relative to the inner cylinder, the attachment extension being of a smaller diameter than the inner cylinder; and
a transition section extending from the outer surface of the inner cylinder to an outer surface of the attachment extension, wherein the inner cylinder, the transition section, and the attachment extension are of an integral construction, wherein the transition section comprises a ramp, a first transition segment, a land, and a second transition segment, wherein the attachment extension comprises a plurality of apertures configured to receive pins in a radial direction, wherein the ramp extends radially inward and aftward from the outer surface of the inner cylinder in the direction of the first transition segment, wherein the first transition segment is disposed between the ramp and the land, wherein the second transition segment is disposed between the land and the attachment extension and extends radially inward and aftward in the direction of the outer surface of the attachment extension, and wherein outer surfaces of the ramp, the first transition segment, the land, and the second transition segment are all disposed in different orientations relative to each other.

2. The turbine engine case of claim 1, further comprising a plurality of vanes extending between the outer cylinder and the inner cylinder.

3. The turbine engine case of claim 1, wherein the attachment extension comprises a cylinder extending in an axial and aftward direction relative to the inner cylinder.

4. The turbine engine case of claim 1, wherein the attachment extension comprises an austenitic nickel-chromium-based alloy.

5. The turbine engine case of claim 1, wherein a radius of the attachment extension is smaller than a radius of the inner cylinder.

6. A center body connection system comprising:
 a turbine engine case comprising an attachment extension and an inner cylinder;
 a center body comprising a ceramic matrix composite ("CMC") housing, wherein an open space extends from an inner surface of the CMC housing to an outer surface of the attachment extension;
 a pin extending through a first aperture in the CMC housing and a second aperture in the attachment extension;
 a transition section extending from an outer surface of the inner cylinder to the attachment extension, wherein the transition section comprises an incline segment, a land, and a transition segment, wherein the incline segment extends radially inward and aftward from the outer surface of the inner cylinder to the land, wherein the land is disposed between the incline segment and the transition segment, and wherein the transition segment is disposed between the land and the attachment extension and extends radially inward and aftward toward the outer surface of the attachment extension, wherein outer surfaces of the incline segment, the land, and the transition segment are all disposed in different orientations relative to each other; and
 a compressible, elastic seal situated between the land of the transition section and the inner surface of the center body and contacting both the incline segment and the land of the transition section, the compressible, elastic seal being configured to compress and decompress to allow axial movement between the CMC housing and the inner cylinder as the CMC housing and the inner cylinder expand and contract at different rates;
 a first configuration where there is a first gap between the outer surface of the attachment extension and the inner surface of the center body and where the elastic seal is in a first compressed state; and
 a second configuration where there is a second gap between the outer surface of the attachment extension and the inner surface of the center body and where the elastic seal is in a second compressed state, wherein the second gap is greater than the first gap, and wherein first compressed state is greater than the second compressed state.

7. The center body connection system of claim 6, wherein a radius of the attachment extension is smaller than a radius of the inner cylinder.

8. The center body connection system of claim 6, wherein the turbine engine case comprises an integral component comprising the attachment extension, the transition section, and the inner cylinder.

9. The center body connection system of claim 6, wherein a coefficient of thermal expansion of the attachment extension is greater than a coefficient of thermal expansion of the CMC housing.

10. The center body connection system of claim 6, wherein the pin is configured to slide through the first aperture in response to expansion of the attachment extension.

11. An aircraft propulsion system comprising:
 a turbine engine aft case comprising an outer cylinder and an inner cylinder with an aerodynamic outer surface in a radial dimension that helps defines a flow path for engine exhaust gases, and an attachment extension extending axially in an aft direction relative to the inner cylinder;
 a center body housing made from a ceramic material, the center body housing at least partially radially overlapping the attachment extension, wherein an open space extends from an inner surface of the center body housing to an outer surface of the attachment extension;
 a transition section extending from the outer surface of the inner cylinder to the attachment extension, wherein the inner cylinder, the transition section, and the attachment extension are of an integral construction, wherein the transition section comprises an incline segment, a land, and a transition segment, wherein the incline segment extends radially inward and aftward from the outer surface of the inner cylinder to the land, wherein the land is disposed between the incline segment and the transition segment, and wherein the transition segment is disposed between the land and the attachment extension and extends radially inward and aftward toward the outer surface of the attachment extension, wherein outer surfaces of the incline segment, the land, and the transition segment are all disposed in different orientations relative to each other; and
 a compressible, elastic seal situated between the land of the transition section and the inner surface of the center body housing and contacting both the incline segment and the land of the transition section, the compressible, elastic seal being configured to compress and decompress to allow axial movement between the center body housing and the inner cylinder as the center body housing and the inner cylinder expand and contract at different rates;
 a first configuration where there is a first gap between the outer surface of the attachment extension and the inner surface of the center body housing and where the elastic seal is in a first compressed state; and
 a second configuration where there is a second gap between the outer surface of the attachment extension and the inner surface of the center body housing and where the elastic seal is in a second compressed state, wherein the second gap is greater than the first gap, and wherein first compressed state is greater than the second compressed state.

12. The propulsion system of claim 11, wherein the inner cylinder, the transition section, and the attachment extension are part of a single integral component.

13. The propulsion system of claim 11, wherein an adjacent portion of the incline segment is located at an angle of between 95-105 degrees relative to the outer surface of the inner cylinder.

14. The propulsion system of claim 11, wherein the attachment extension comprises an austenitic nickel-chromium-based alloy.

15. The turbine engine case of claim 1, wherein an included angle between the outer surface of the inner cylinder and the outer surface of the ramp is within a range between 95° and 105°.

16. The turbine engine case of claim 1, wherein the outer surface of the inner cylinder, the outer surface of the land of the transition section, and the outer surface of the attachment extension are parallel to one another.

17. The center body connection system of claim 6, wherein an included angle between the outer surface of the inner cylinder and the outer surface of an adjacent portion of the incline segment is within a range between 95° and 105°.

18. The center body connection system of claim 6, wherein the outer surface of the inner cylinder, the outer surface of the land of the transition section, and the outer surface of the attachment extension are parallel to one another.

19. The propulsion system of claim 11, wherein the outer surface of the inner cylinder, the outer surface of the land of the transition section, and the outer surface of the attachment extension are parallel to one another.

* * * * *